(12) United States Patent
Kojima et al.

(10) Patent No.: US 7,958,308 B2
(45) Date of Patent: Jun. 7, 2011

(54) RECORDING CONTROLLER AND RECORDING CONTROL METHOD

(75) Inventors: Hiroyuki Kojima, Kawasaki (JP); Masaki Ukai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 481 days.

(21) Appl. No.: 12/222,377

(22) Filed: Aug. 7, 2008

(65) Prior Publication Data

US 2008/0301368 A1 Dec. 4, 2008

Related U.S. Application Data

(63) Continuation of application No. PCT/JP2006/303440, filed on Feb. 24, 2006.

(51) Int. Cl.
*G06F 12/00* (2006.01)

(52) U.S. Cl. ......... 711/119; 711/143; 711/144; 711/156

(58) Field of Classification Search .................. 711/119, 711/143, 144, 156
See application file for complete search history.

(56) References Cited

U.S. PATENT DOCUMENTS

| 4,774,687 | A | | 9/1988 | Taniguchi et al. |
| 5,491,811 | A | | 2/1996 | Arimilli et al. |
| 5,535,358 | A | | 7/1996 | Kimura et al. |
| 5,913,226 | A | * | 6/1999 | Sato ............................. 711/146 |
| 6,574,709 | B1 | * | 6/2003 | Skazinski et al. ............. 711/119 |
| 7,120,755 | B2 | * | 10/2006 | Jamil et al. ................... 711/141 |
| 2003/0149845 | A1 | * | 8/2003 | Fu ................................. 711/144 |
| 2007/0192540 | A1 | * | 8/2007 | Gara et al. ..................... 711/117 |

FOREIGN PATENT DOCUMENTS

| JP | 61-11865 | 1/1986 |
| JP | 6-83703 | 3/1994 |
| JP | 7-234819 | 9/1995 |
| JP | 11-134257 | 5/1999 |

OTHER PUBLICATIONS

International Search Report for PCT/JP2006/303440 mailed Aug. 1, 2006.

* cited by examiner

*Primary Examiner* — Stephen C Elmore
(74) *Attorney, Agent, or Firm* — Staas & Halsey LLP

(57) ABSTRACT

Upon retrieving, after occurrence of replacement of a first cache, move out (MO) data that is a write back target, a second cache determines, based on data that is set in a control flag of a register, whether a new registration process of move in (MI) data with respect to a recording position of the MO data is completed. Upon determining that the new registration process is not completed, the second cache cancels the new registration process to ensure that a request of the new registration process is not output to a pipeline.

6 Claims, 11 Drawing Sheets

RECORDING CONTROLLER AND RECORDING CONTROL METHOD

CROSS REFERENCE TO RELATED APPLICATIONS

This is a continuing application, filed under 35 U.S.C. §111(a), of International Application PCT/JP2006/303440, filed Feb. 24, 2006, the contents of which are incorporated herein by reference.

BACKGROUND OF THE INVENTION

1. Field of the Invention

The present invention relates to a recording controller and a recording control method that carry out recording control of data with respect to a first cache and a second cache that are included in a processor.

2. Description of the Related Art

Recently, a cache is internally included in a processor and data that is recorded in a main memory is temporarily recorded in the cache, thus enhancing a process speed for a memory access (for example, see Japanese Patent Application Laid-open No. H11-134257). A structure of the existing processor is explained next.

Figure 8:
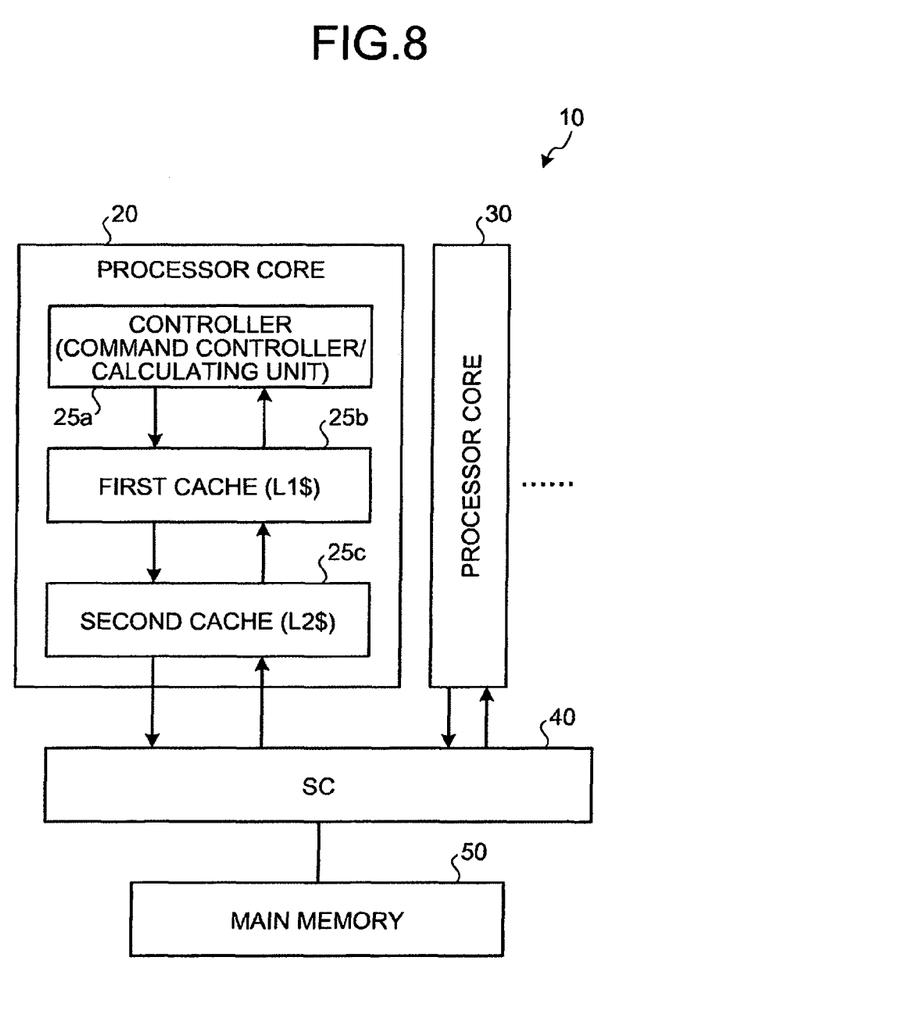
FIG. 8 is a functional block diagram of an existing processor.

FIG. 8 is a functional block diagram of the existing processor. As shown in FIG. 8, a processor 10 includes processor cores 20 and 30, a system controller (SC) 40, and a main memory 50. For the sake of convenience, only the processor cores 20 and 30 are shown in FIG. 8. However, the processor 10 includes a plurality of processor cores (the multiple processor cores are connected to the SC 40).

According to a data request from the processor cores 20 and 30, the SC 40 mainly retrieves data that is recorded or stored in the main memory 50 and distributes the retrieved data to the processor cores 20 and 30. The main memory 50 is a recording device that records therein the data (commands and data that is a calculation target) that is used by the processor cores 20 and 30.

The processor cores 20 and 30 retrieve the data that is recorded or stored in the main memory 50 and execute predetermined processes. Because the processor cores 20 and 30 include the same structural components, a structure of only the processor core 20 is explained. The processor core 20 includes a controller (command controller/calculating unit) 25a, a first cache 25b, and a second cache 25c.

The controller 25a retrieves via the second cache 25c and the first cache 25b, the data that is recorded or stored in the main memory 50, interprets a command, and executes a predetermined process (a calculating process corresponding to the command etc.).

Figure 9:
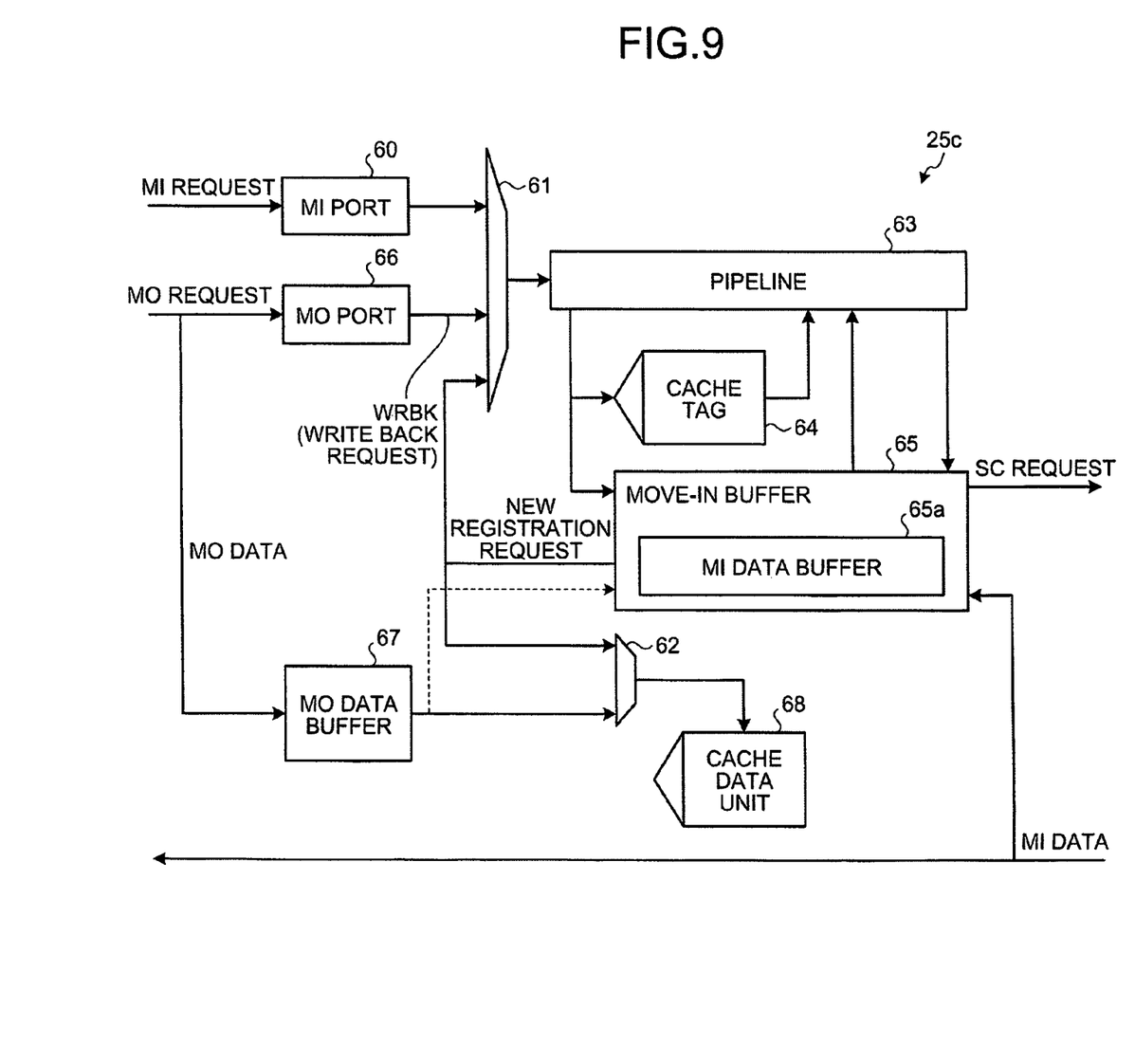
FIG. 9 is a functional block diagram of an existing second cache.

A structure of the existing second cache 25c is explained next. FIG. 9 is a functional block diagram of the existing second cache 25c. As shown in FIG. 9, the existing second cache 25c includes a move in (MI) port 60, arbitrating circuits 61 and 62, a pipeline 63, a cache tag 64, a move-in buffer 65, a move out (MO) port 66, an MO data buffer 67, and cache data unit 68.

Each process or operation of structural components of the second cache 25c is explained next. The MI port 60 receives (when data corresponding to a data request from the controller 25a is not recorded in the first cache 25b shown in FIG. 8) a data request (hereinafter, "MI request") from the first cache 25b and outputs the MI request to the pipeline 63 via the arbitrating circuit 61.

Upon retrieving the MI request, the pipeline 63 determines, based on the cache tag 64, whether the data corresponding to the MI request exists in the second cache 25c. If the data corresponding to the MI request exists in the second cache 25c, the pipeline 63 searches the data from the cache data unit 68, and outputs the data to the first cache 25b.

If the data corresponding to the MI request does not exist in the second cache 25c, the pipeline 63 outputs to the move-in buffer 65, data to the effect that the data corresponding to the MI request does not exist in the second cache 25c. Next, the move-in buffer 65 requests (outputs an SC request to the SC 40) the SC 40 for the data corresponding to the MI request. Next, upon retrieving the data corresponding to the MI request (hereinafter, "MI data") from the SC 40, the move-in buffer 65 writes the MI data to an MI data buffer 65a and simultaneously transfers the MI data to the first cache 25b.

Upon completing a preparation to record the MI data in the cache data unit 68, the move-in buffer 65 activates a new registration process and registers in the cache data unit 68, the MI data that is recorded in the MI data buffer 65a.

However, upon retrieving the MI data and distributing the MI data to the controller 25a, the first cache 25b stores therein a calculation result by the controller 25a, thus storing therein the latest data compared to the second cache 25c. In the circumstances mentioned earlier, if the data of the first cache 25b is replaced, a write back to the second cache 25c occurs.

The MO port 66 retrieves the write back request (hereinafter, "MO request") from the first cache 25b and outputs a request of a write back process (hereinafter, a write back request "WRBK") to the pipeline 63 via the arbitrating circuit 61. Data, which is a write back target, (hereinafter, "MO data") is registered in the MO data buffer 67.

Upon retrieving the request of the write back process, the pipeline 63 registers in the cache data unit 68 via the arbitrating circuit 62, the MO data that is recorded in the MO data buffer 67. Thus, the latest data (MO data) is recorded in the cache data unit 68.

However, in the conventional technology mentioned earlier, when writing back the data from the first cache 25b to the second cache 25c, if the new registration process by the move-in buffer 65 is not completed due to some reason, the latest data that is registered in the cache data unit 68 is lost.

Figure 10:
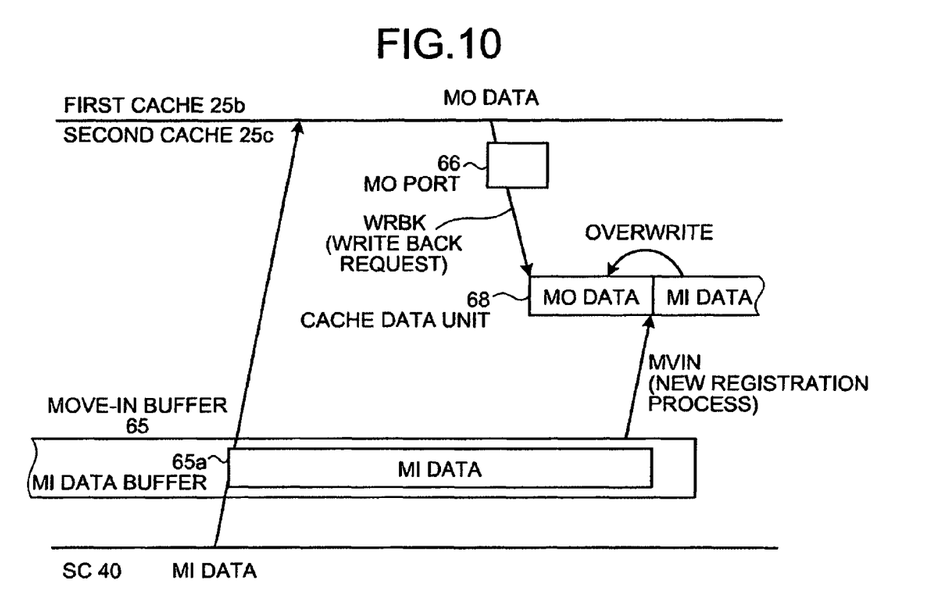
FIG. 10 is a schematic diagram for explaining a drawback in a conventional technology.

FIG. 10 is a schematic diagram for explaining a drawback in the conventional technology. As shown in FIG. 10, the move-in buffer 65 retrieves the MI data from the SC 40 and registers the MI data in the MI data buffer 65a. Simultaneously, the MI data is transferred to the first cache 25b. The new registration process, which is carried out by the move-in buffer 65 that registers the MI data in the cache data unit 68, is likely to be delayed due to some reason (for example, if multiple data other than the MI data exist that need to be processed).

During a delay in the new registration process, if the latest data (MO data), which reflects the calculation result with respect to the MI data, is written back due to a replacing process of the first cache 25b, the MI data is recorded in the cache data unit 68 on the second cache 25c after the MO data is recorded in the cache data unit 68. In other words, the latest data is overwritten by obsolete data.

SUMMARY

It is an object of the present invention to at least partially solve the problems in the conventional technology.

According to an aspect of the present invention, a recording controller that carries out recording control of data with respect to a first cache and a second cache that are included in a processor, includes a determining unit that determines, at the time of writing back to the second cache, a first data that is recorded in the first cache, whether a second data that is data before updation of the first data is already recorded in a recording position of the second cache whereto the first data is written back; and a recording controlling unit that curbs, upon the determining unit determining that the second data is not recorded in the recording position, a recording of the second data in the recording position, and records the first data in the recording position.

According to another aspect of the present invention, a recording control method that carries out recording control of data with respect to a first cache and a second cache that are included in a processor, includes determining, at the time of writing back to the second cache, a first data that is recorded in the first cache, whether a second data that is data before updation of the first data is already recorded in a recording position of the second cache whereto the first data is written back; and curbing, upon the determining that the second data is not recorded in the recording position, a recording of the second data in the recording position, and recording the first data in the recording position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the recording controller and the recording control method according to the present invention are explained below with reference to the accompanying drawings. However, the present invention is not limited to the embodiments.

A salient feature of the present invention is explained first by comparing with a conventional technology. In the conventional technology, when data is written back from the first cache 25b to the second cache 25c that are shown in FIG. 8, if a new registration process by the move-in buffer 65 shown in FIG. 9 is not completed due to some reason, the latest data that is registered in the cache data unit 68 is overwritten with obsolete data. Various technologies have been suggested to overcome the drawback. Two of the technologies are explained as an example.

Figure 11:
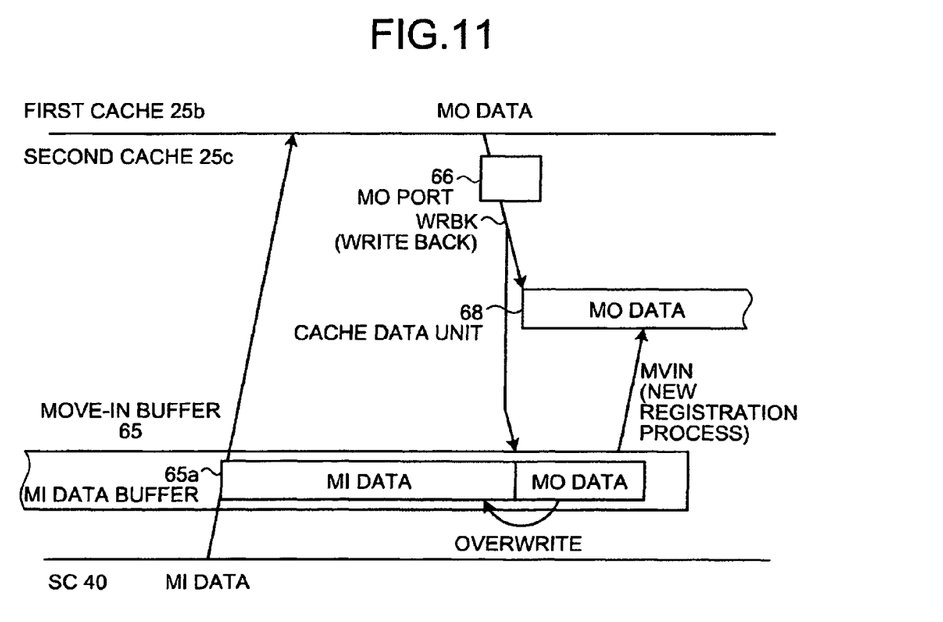
FIG. 11 is a schematic diagram for explaining a first conventional technology.

A first conventional technology is explained first. FIG. 11 is a schematic diagram for explaining the first conventional technology. As shown in FIG. 11, in the first conventional technology, at the time of a write back process from the first cache 25b to the second cache 25c, move in (MI) data that is recorded in the MI data buffer 65a is overwritten with move out (MO) data. Overwriting the MI data, which is recorded in the MI data buffer 65a, with the MO data ensures that finally the MO data is written to the cache data unit 68 even if the new registration process by the move-in buffer 65 is delayed. Thus, the drawback is overcome.

Figure 12:
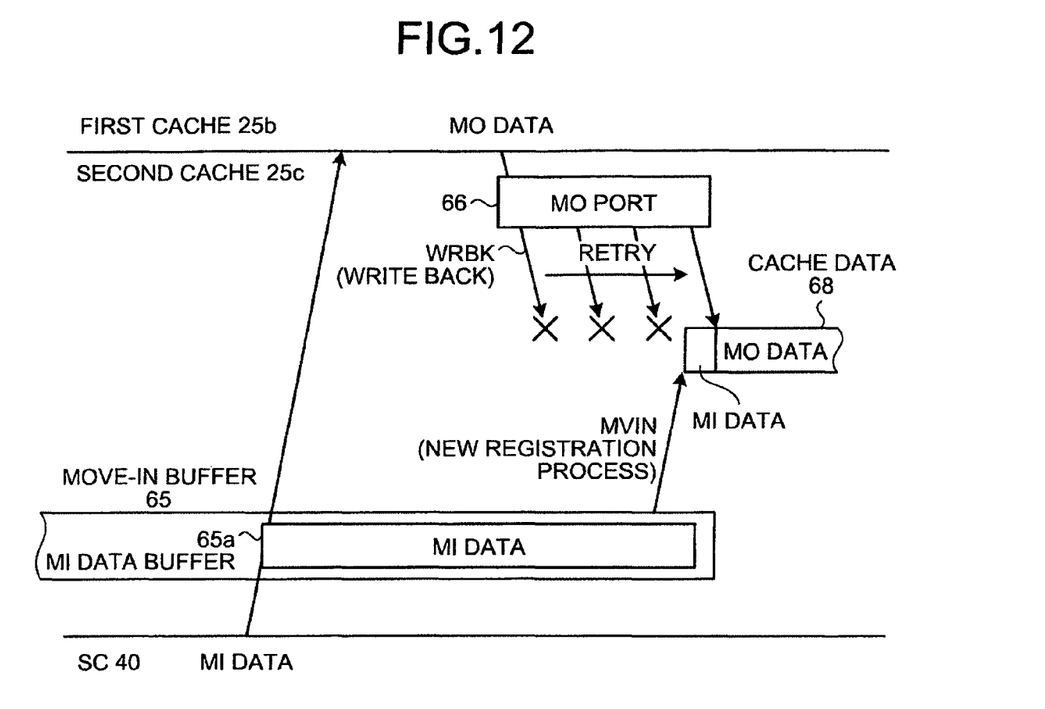
FIG. 12 is a schematic diagram for explaining a second conventional technology.

A second conventional technology is explained next. FIG. 12 is a schematic diagram for explaining the second conventional technology. As shown in FIG. 12, in the second conventional technology, the write back process is retried until the end of the new registration process to ensure that the write back process in the same block is executed without fail after the new registration process by the move-in buffer 65. Alternatively, for the sake of simplicity, the write back process is retried until the move-in buffer 65 is opened, thus ensuring that finally the MO data is written to the cache data unit 68.

Figure 13:
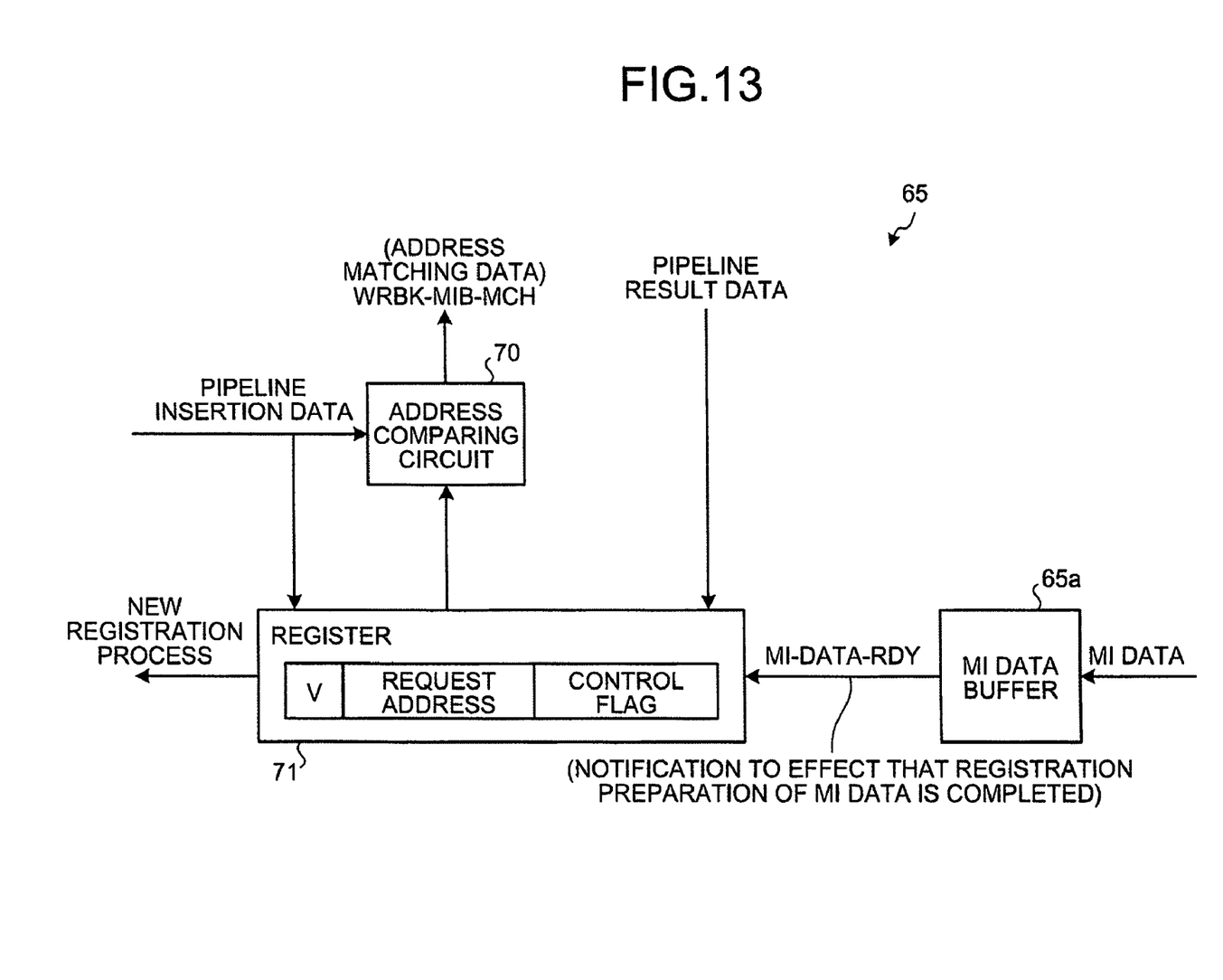
FIG. 13 is a functional block diagram of a move-in buffer according to the conventional technology.

In any of the first and the second conventional technologies mentioned earlier, a detecting structure is necessitated that detects whether to avoid the drawback. A structure of the move-in buffer 65 according to the conventional technology is explained. FIG. 13 is a functional block diagram of the move-in buffer 65. As shown in FIG. 13, the move-in buffer 65 includes the MI data buffer 65a, an address comparing circuit 70, and a register 71.

Each process performed by structural components shown in FIG. 13 is explained next. Upon the pipeline 63 determining that a cache miss has occurred, the register 71 retrieves from the pipeline 63, pipeline result data that includes data to the effect that a cache miss is detected and an address of the MI data. Next, the register 71 sets valid data (VALID), a request address that indicates the address of the MI data, and a control flag that is referred at the time of executing the new registration process (at the same point of time, the move-in buffer 65 outputs a system controller (SC) request to the SC 40).

The MI data that is output from the SC 40 is registered in the MI data buffer 65a. Upon completing a registration preparation of the MI data with respect to the cache data unit 68, the MI data buffer 65a outputs data to that effect to the register 71. Upon retrieving from the MI data buffer 65a, the data to the effect that the registration preparation of the MI data is completed, the register 71 reflects the data in the control flag (for example, modifies a content of the control flag from "registration preparation under process" to "registration preparation completed"). Based on the control flag of the register 71, upon determining that the new registration process can be carried out, the move-in buffer 65 outputs a request of the new registration process to the pipeline 63.

When a write back to the second cache 25c occurs, the request of the write back process is output to the pipeline 63. Further, pipeline insertion data, which includes address data of the MO data that is a write back target, is output to the address comparing circuit 70.

Upon retrieving the pipeline insertion data, the address comparing circuit 70 compares the address of the MO data and the address of the MI data that is registered in the request address, and determines whether the address of the MO data matches with the address of the MI data. If the address of the MO data matches with the address of the MI data (in other words, if a recording position of the MO data matches with a recording position of the MI data), the address comparing circuit 70 outputs to the pipeline 63, data (address matching data) to the effect that the address of the MO data matches with the address of the MI data.

In the first conventional technology that is shown in FIG. 11, upon the request of the write back process being input into the pipeline 63, retrieving the address data enables to detect a necessity to overwrite the latest data (MO data) with the data (MI data) of the same block in the MI data buffer 65*a*.

Further, in the second conventional technology that is shown in FIG. 12, upon the request of the write back process being input into the pipeline 63, retrieving the address matching data enables to detect that the write back process of the MO data is retried until the move-in buffer 65 is opened (until the new registration process is completed).

Next, the respective drawbacks in the first conventional technology and the second conventional technology are sequentially explained. In the first conventional technology, when overwriting the MO data, which is recorded in the MO data buffer 67, to the MI data buffer 65*a*, a new data path needs to be arranged that is indicated by a dotted line shown in FIG. 9, thus resulting in additional cost. Further, if the request of the new registration process is input immediately after the write back request is input into the pipeline 63, the new registration process is executed even when overwriting in the MI data buffer 65*a* due to the write back request is not completed. Due to this, finally, the obsolete data (MI data) is registered in the cache data unit 68.

To overcome the drawback mentioned earlier, output of the new registration request to the pipeline 63 is prohibited immediately after the request of the write back process is input into the pipeline 63. However, due to this, a process of the move-in buffer 65 is disrupted.

In the second conventional technology, the write back process is retried until the new registration process is completed. However, due to this, the MO port 66 is occupied until the new registration process is completed or until the move-in buffer 65 is opened. Thus, the subsequent processes cannot be speedily executed.

Figure 1:
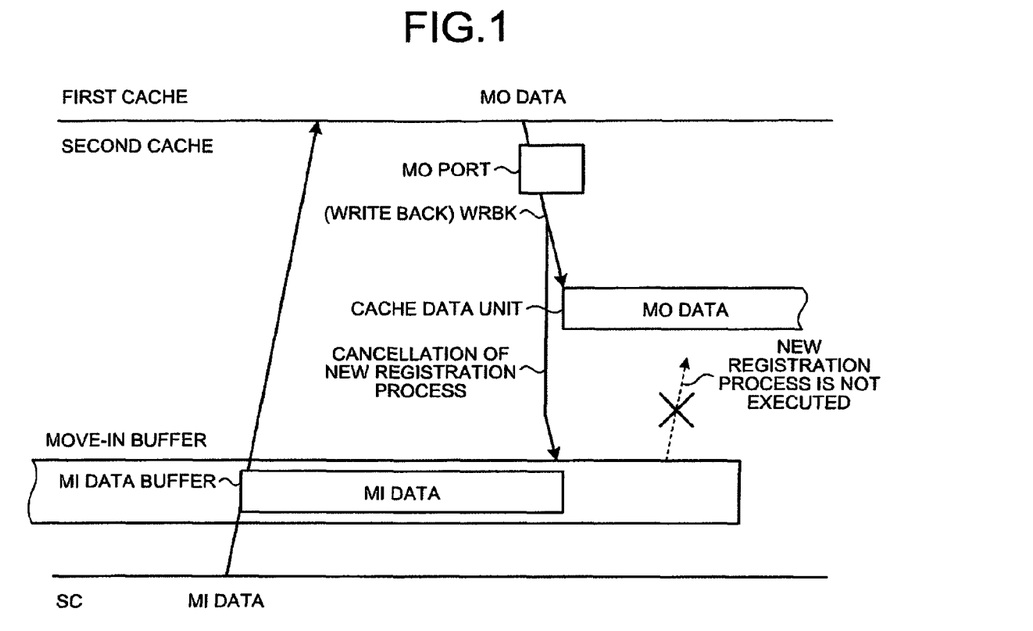
FIG. 1 is a schematic diagram for explaining the salient feature of the present invention.

The present invention overcomes the drawbacks in the conventional technologies mentioned earlier. FIG. 1 is a schematic diagram for explaining the salient feature of the present invention. As shown in FIG. 1, when writing the latest data (MO data) in a cache data unit by using the write back process from a first cache to a second cache, upon detecting that the new registration process with respect to the block is incomplete, a request is issued to a move-in buffer to cancel the new registration process. Because canceling the new registration process ensures that the new registration process is not executed, writing of the obsolete data (MI data) to the cache data unit is prevented.

Figure 2:
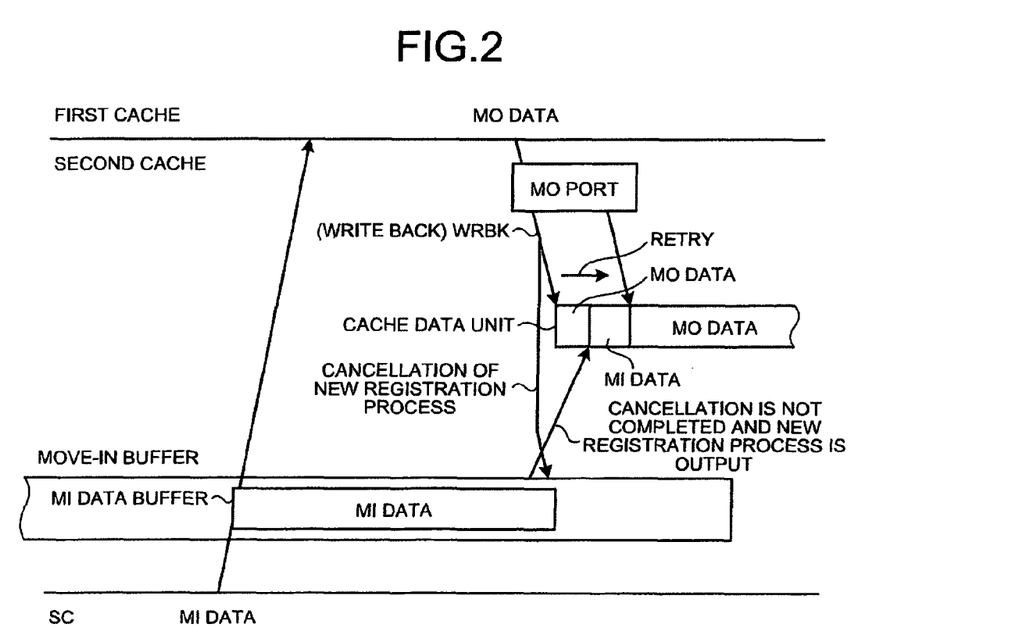
FIG. 2 is a schematic diagram of for explaining a process according to the present invention when a timing misalignment occurs.

Sometimes, the new registration process is likely to be already output to a pipeline at the time of canceling the new registration process (a timing misalignment). FIG. 2 is a schematic diagram of for explaining a process according to the present invention when a timing misalignment occurs. As shown in FIG. 2, in the present invention, when the write back process is input into the pipeline, upon detecting that the new registration process in the block is incomplete, the new registration process is cancelled and the MO data is written to the cache data unit.

Although the new registration process is already output to the pipeline, because a cancel request of the new registration process is output to the move-in buffer, the new registration process cannot be retried. In this case, the latest data (MO data) can be finally written to the cache data unit by retrying the write back process.

Figure 3:
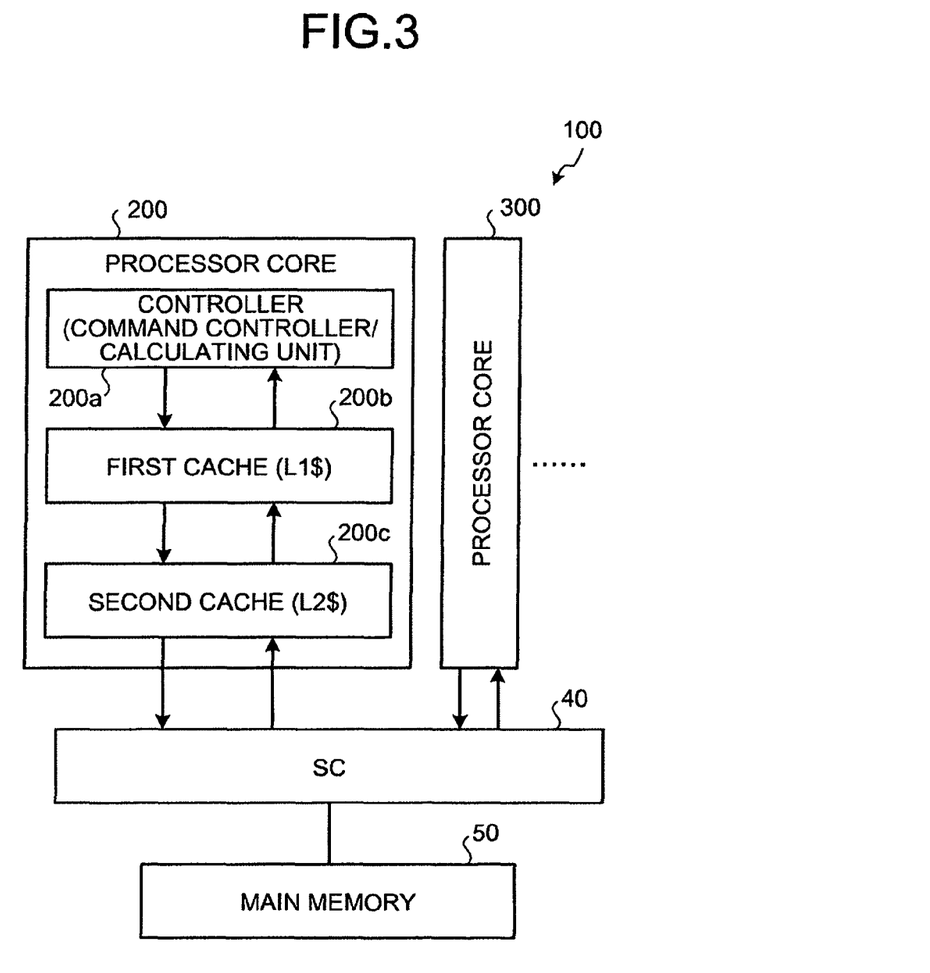
FIG. 3 is a functional block diagram of a processor according to the present invention.

A structure of a processor according to the present invention is explained next. FIG. 3 is a functional block diagram of a processor 100 according to the present invention. As shown in FIG. 3, the processor 100 includes processor cores 200 and 300, the SC 40, and the main memory 50. Structural components, which are the same as the respective structural components shown in FIG. 8, are indicated by the same reference numerals and an explanation is omitted.

The processor cores 200 and 300 retrieve data that is recorded or stored in the main memory 50 and execute predetermined processes. Because the processor cores 200 and 300 include the same structural components, a structure of only the processor core 200 is explained. The processor core 200 includes a controller (command controller/calculating unit) 200*a*, a first cache 200*b*, and a second cache 200*c*.

The controller 200*a* retrieves via the second cache 200*c* and the first cache 200*b*, the data that is recorded or stored in the main memory 50, interprets a command, and executes a predetermined process (a calculating process corresponding to the command etc.).

Figure 4:
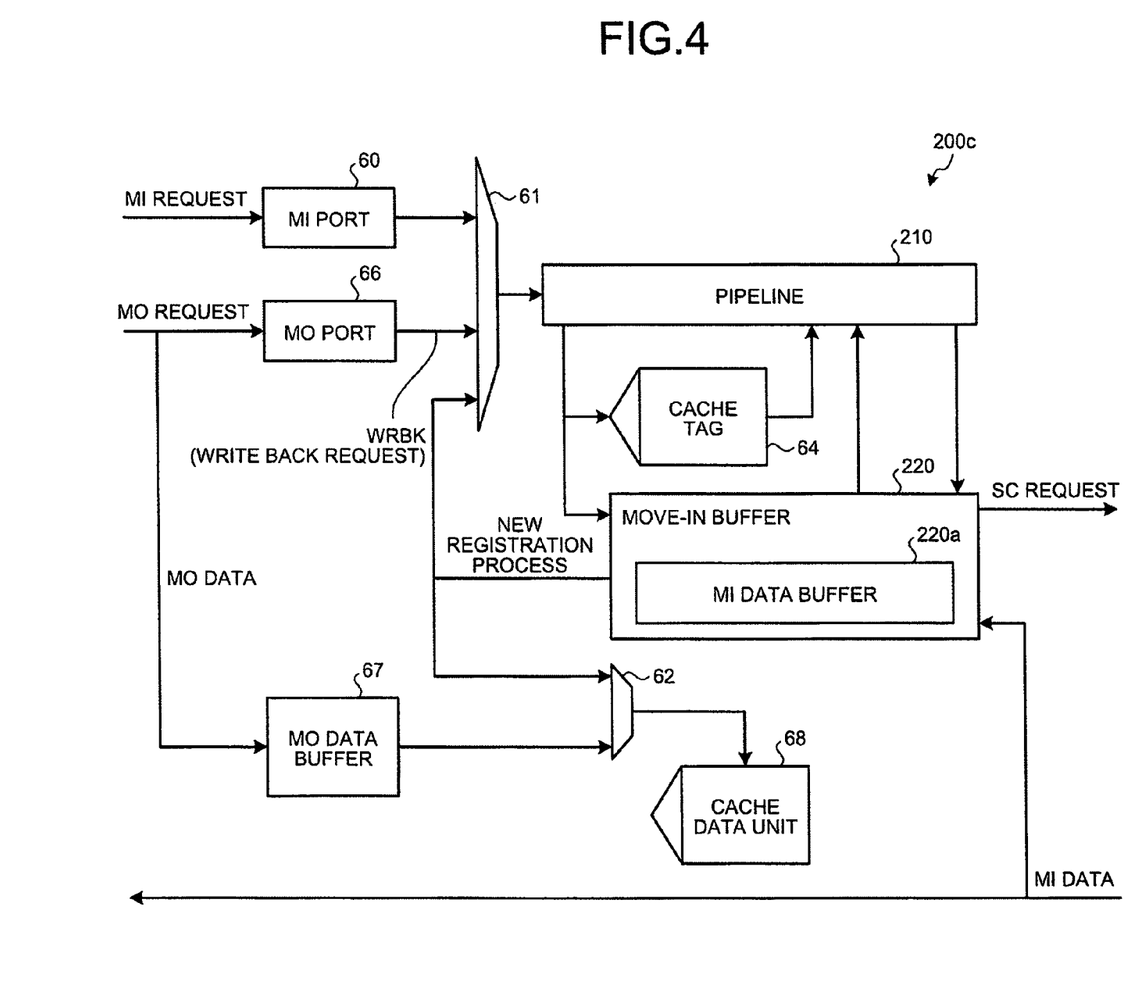
FIG. 4 is a functional block diagram of a second cache according to the embodiment of the present invention.

A structure of the second cache 200*c* according to an embodiment of the present invention is explained next. FIG. 4 is a functional block diagram of the second cache 200*c* according to the embodiment. As shown in FIG. 4, the second cache 200*c* includes the MI port 60, the arbitrating circuits 61 and 62, a pipeline 210, the cache tag 64, a move-in buffer 220, the MO port 66, the MO data buffer 67, and the cache data unit 68. Structural components, which are the same as the respective structural components that are explained with reference to FIG. 9, are indicated by the same reference numerals and an explanation is omitted.

The pipeline 210 mainly retrieves the MI request, the request of the write back process (write back request), or a request of the new registration process, and parallely executes processes corresponding to the retrieved requests. Next, the processes of the pipeline 210 are sequentially explained.

Upon retrieving the MI request, based on the cache tag 64, the pipeline 210 determines whether the data corresponding to the MI request exists in the second cache 200*c*. If the data corresponding to the MI request exists in the second cache 200*c*, the pipeline 210 searches the data from the cache data unit 68 and outputs the data to the first cache 200*b*.

If the data corresponding to the MI request does not exist in the second cache 200*c*, the pipeline 210 outputs to the move-in buffer 220, pipeline result data that includes data to the effect that a cache miss is detected and an address of the MI data. Next, the move-in buffer 220 outputs an SC request to the SC 40.

Upon retrieving the request of the write back process, the pipeline 210 determines, in cooperation with the move-in buffer 220, whether to retry the write back process of the MO data, and executes a process based on the determination result. When retrying the write back process of the MO data, the pipeline 210 retries a process to write back to the cache data unit 68, the MO data that is recorded in the MO data buffer 67. In other words, the pipeline 210 repeatedly records in the cache data unit 68, the MO data that is recorded in the MO data buffer 67.

The move-in buffer 220 is a recording device that records therein the MI data that is output from the SC 40. Further, the move-in buffer 220 controls data that becomes a standard to determine whether to cancel the new registration process or whether to retry the write back process of the MO data.

Figure 5:
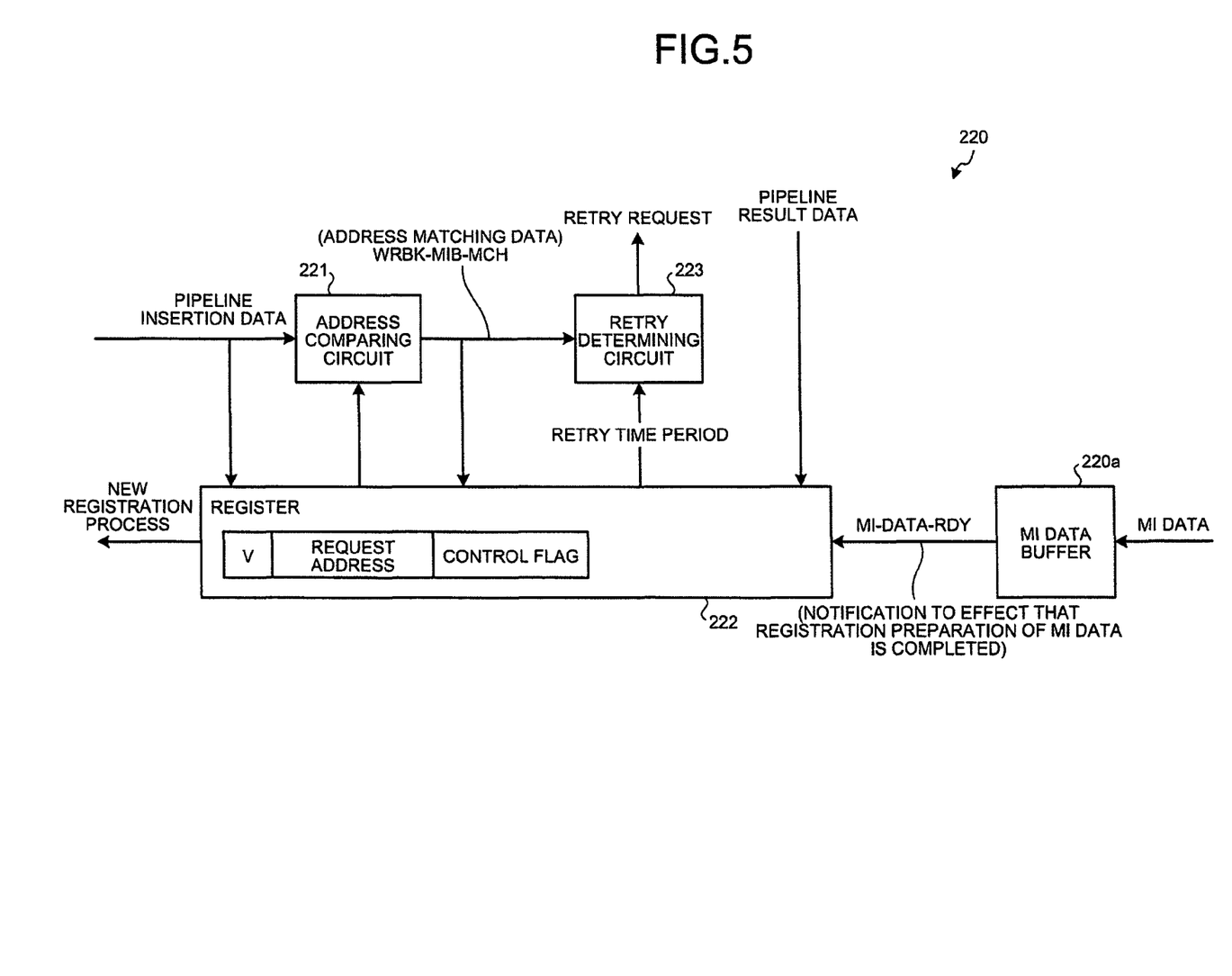
FIG. 5 is a functional block diagram of a move-in buffer.

FIG. 5 is a functional block diagram of the move-in buffer 220. As shown in FIG. 5, the move-in buffer 220 includes an MI data buffer 220a, an address comparing circuit 221, a register 222, and a retry determining circuit 223.

Upon retrieving the pipeline insertion data, which includes the address data of the MO data that is the write back target, the address comparing circuit 221 compares the address of the MO data and the address of the MI data that is stored in the register 222, and determines whether the address of the MO data matches with the address of the MI data. If the address of the MO data matches with the address of the MI data (in other words, if a recording position of the MO data matches with a recording position of the MI data), the address comparing circuit 221 outputs to the register 222 and the retry determining circuit 223, data (address matching data) to the effect that the address of the MO data matches with the address of the MI data.

The register 222 stores therein and controls valid data (VALID), a request address that indicates the address of the MI data, and a control flag that indicates whether to retry the write back process or whether to execute the new registration process. Upon retrieving the address matching data from the address comparing circuit 221, the register 222 executes a process to cancel the new registration process. When canceling the new registration process, the register 222 operates the control flag and forcibly sets a completion flag of the new registration process in the control flag (a separate flag can also be included that indicates that the new registration process is forcibly completed due to cancellation of the new registration process).

The register 222 forcibly sets the completion flag of the new registration process in the control flag of the register 222. Due to this, upon the register 222 retrieving from the MI data buffer 220a, data to the effect that the registration preparation of the MI data is completed, the new registration process that is to be executed is cancelled. Thus, the move-in buffer 220 does not output the request of the new registration process to the pipeline 210 and recording of the obsolete data (MI data) in the cache data unit 68 can be prevented.

Upon retrieving the address matching data from the address comparing circuit 221, based on the control flag of the register 222, the retry determining circuit 223 determines whether the write back process needs to be retried due to a timing misalignment of the write back process and the new registration process. Upon determining that the write back process needs to be retried, the retry determining circuit 223 outputs a retry request to the pipeline 210. The retry determining circuit 223 determines whether to retry the write back process according to data that is stored in the control flag. However, the data stored in the control flag changes constantly.

Figure 6:
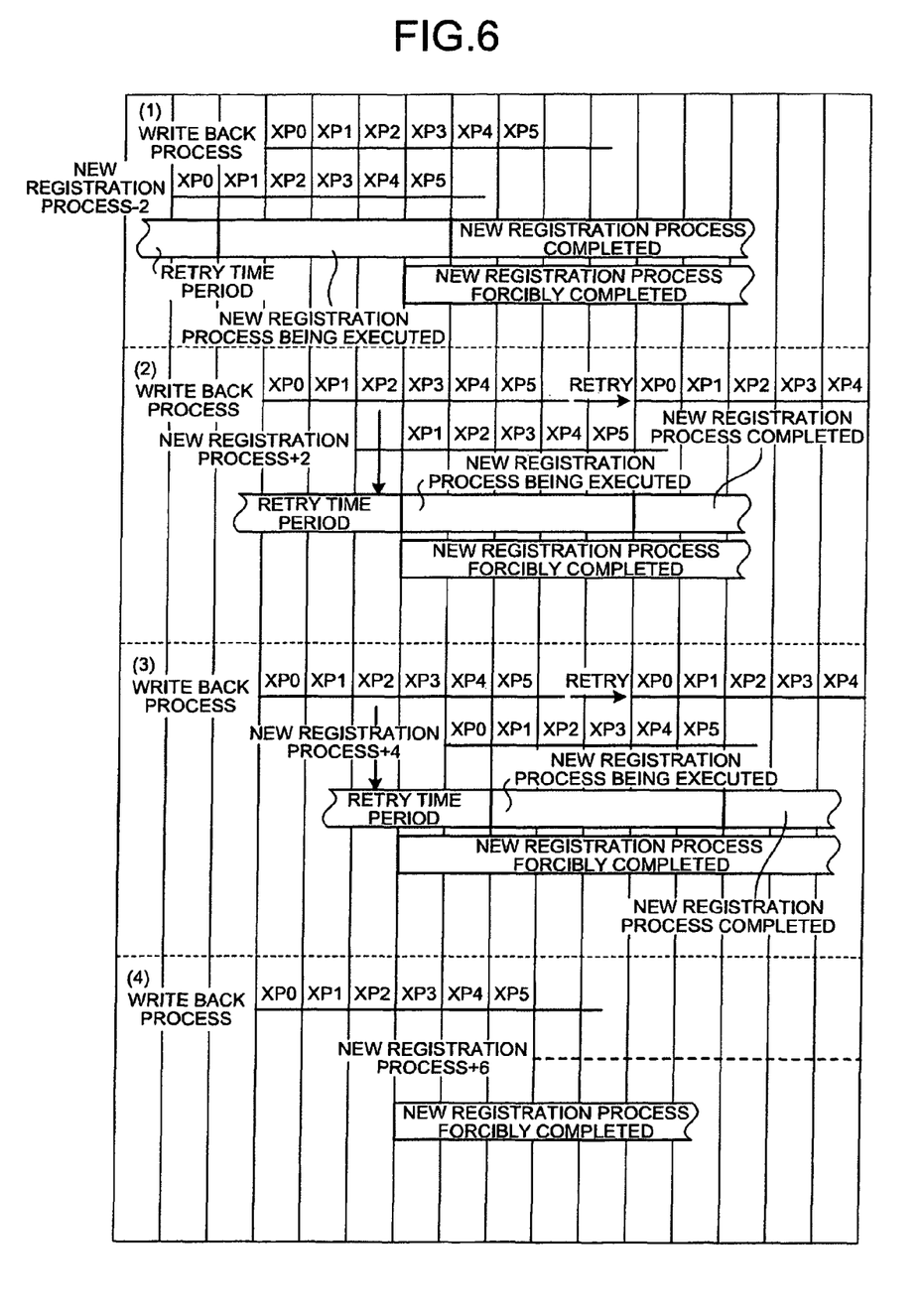
FIG. 6 is a schematic diagram for explaining data that is stored in a control flag.

The data, which is stored in the control flag, is explained next. FIG. 6 is a schematic diagram for explaining the data that is stored in the control flag. As shown in FIG. 6, the schematic diagram indicates a relation between each stage XPn (a numeral n indicates a stage number of the process) of the write back process and the new registration process that are executed by the pipeline 210 and the data that is stored in the control flag. Further, any one of "new registration process being executed", "new registration process completed", "new registration process forcibly completed", or "retry time period" is set in the data that is stored in the control flag.

Further, it is assumed that the address comparing circuit 221 shown in FIG. 5 carries out address comparison at a stage XP2 of the write back process.

The data "new registration process being executed" indicates data that is set in the control flag until a result of the new registration process is returned from the pipeline 210 after the move-in buffer 220 has issued a request of the new registration process to the pipeline 210. Thus, "new registration process being executed" indicates that the new registration process is being executed.

The data "new registration process completed" indicates data that is set in the control flag after execution of the new registration process by the pipeline 210 and completion of registration of the MI data in the cache data unit 68 until the move-in buffer 220 is opened. Thus, the data "new registration process completed" prevents activation of the new registration process and is also used as an opening condition of the move-in buffer 220 due to completion of the new registration process.

The data "new registration process forcibly completed" is data that is set in the control flag for canceling unprocessed new registration data in the same block due to the write back process according to the present invention. The data "new registration process forcibly completed" remains valid after the cancellation of the new registration process due to the write back process until the move-in buffer 220 is opened. Because the cancellation of the new registration process due to the write back process occurs at the point of time when the register 222 has retrieved the address matching data from the address comparing circuit 221 (the stage XP2 in the write back process), the data "new registration process forcibly completed" is set in the control flag from a stage XP3 of the write back process until the move-in buffer 220 is opened. After the data "new registration process forcibly completed" is set in the control flag, the subsequent new registration process is cancelled.

The data "retry time period" is data that is set in the control flag after the preparation to register the MI data in the cache data unit 68, by the MI data buffer shown in FIG. 5, is completed and until the request of the new registration process is issued to the pipeline 210. The pipeline 210 retries the write back process during the time period when "retry time period" is set in the control flag.

Numerals (1) to (4), which are shown in FIG. 6, indicate examples of operations, according to output timings of the request of the new registration process to the pipeline 210, when the request of the new registration process, with respect to the write back process, is output to the pipeline 210 before and after the write back process.

As shown in (1) of FIG. 6, because the write back process is executed after the new registration process, the drawback in the conventional technology does not occur. In other words, because the MO data is recorded in the cache data unit 68 due to the write back process after the MI data has been recorded in the cache data unit 68 due to the new registration process, finally the latest data is registered in the cache data unit 68. Similarly, the drawback in the conventional technology does not occur when the new registration process is executed before (1).

Numerals (2) to (4) indicate examples when the request of the new registration process is output to the pipeline 210 after the request of the write back process (write back request) has been output to the pipeline 210. However, because the data "new registration process forcibly completed" is set in the control flag after the timing at the stage XP3 of the write back process, the request of the new registration process is not output to the pipeline 210 after the example indicated by (4). Thus, the drawback in the conventional technology does not occur.

In other words, the timing misalignment occurs (cancellation of the new registration process is not carried out at the appropriate timing and the new registration process is executed after the write back process) in the examples indicated by the numerals (2) and (3). The write back process is retried during the time period in the examples indicated by the numerals (2) and (3). Because a timing to carry out retry determination is the timing at the stage XP2 in the write back process, the control flag can be operated to ensure that the data "retry time period" is set in the control flag when the retry determining circuit 223 refers to the control flag at the timing mentioned earlier.

If the new registration process is curbed due to cancellation of the new registration process, the data that is set in the control flag is not modified from "retry time period" to "new registration process being executed". The register 222 modifies the data that is set in the control flag from "retry time period" to "new registration process being executed" at the timing when the register 222 retrieves the address matching data that is input from the address comparing circuit 221 at the time of canceling the new registration process.

In the example indicated by the numeral (4), if the registration preparation of the MI data by the MI data buffer 220a is already completed when the request of the write back process is output to the pipeline 210, because the data "retry time period" is set in the control flag, the write back process is retried only once. The data "retry time period" is released by a comparing process of the address comparing circuit 221 due to the write back process and the write back process is not retried afterwards.

Figure 7:
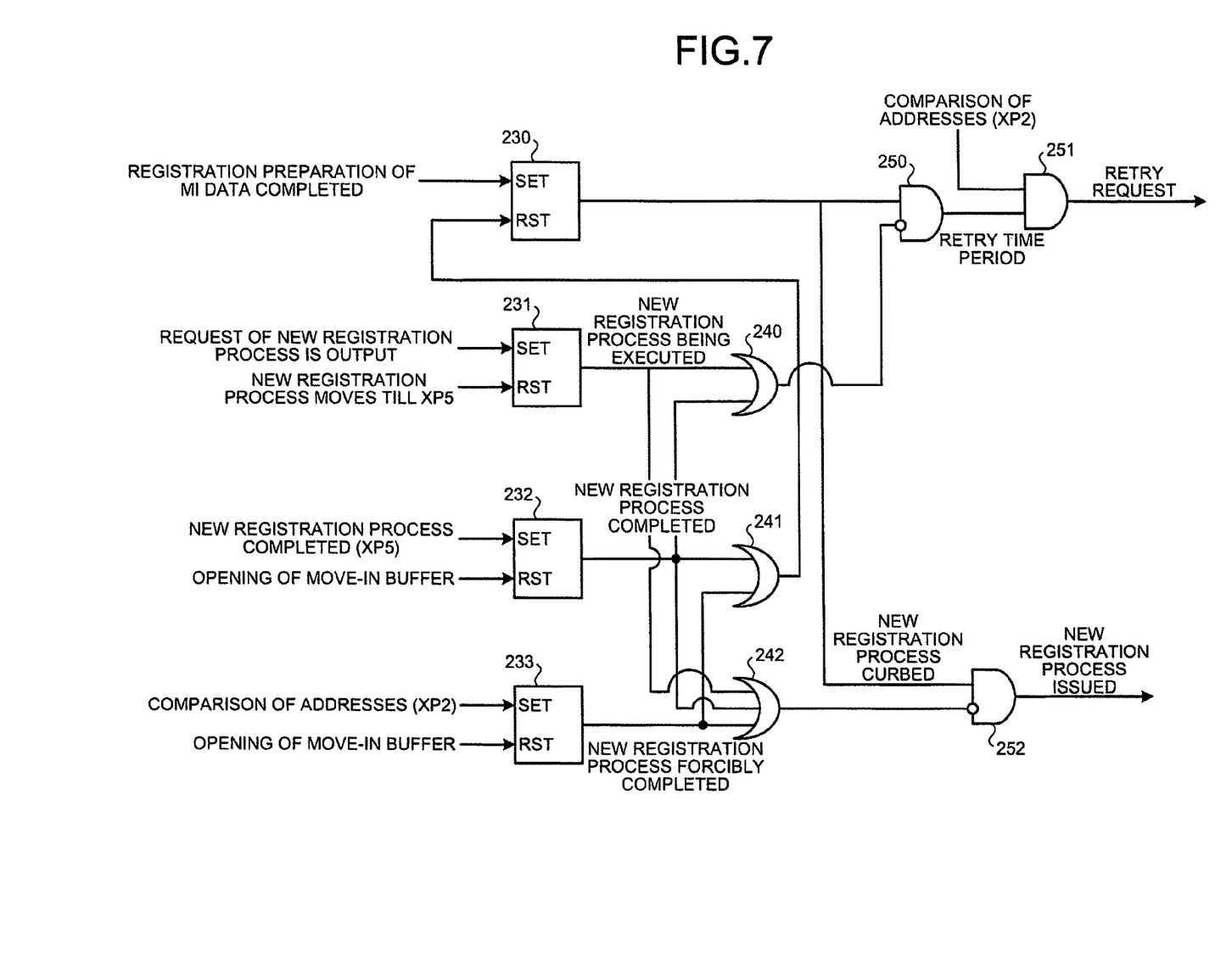
FIG. 7 is a schematic diagram of an example of a circuit that executes a process that is explained with reference to FIG. 6.

A circuit, which executes the process that is explained with reference to FIG. 6, is explained next. FIG. 7 is a schematic diagram of an example of the circuit that executes the process explained with reference to FIG. 6. The circuit of FIG. 7 is internally included in the register 222 that is shown in FIG. 5. As shown in FIG. 7, the circuit includes set/reset circuits 230 to 233, OR circuits 240 to 242, and AND circuits 250 to 252.

The set/reset circuit 230 outputs "high" when the registration preparation of the MI data in the MI data buffer 220a is completed and outputs "low" when "high" is input from the OR circuit 241.

The set/reset circuit 231 outputs "high" when the request of the new registration process is output to the pipeline 210 and outputs "low" when the new registration process moves to the stage XP5 that is shown in FIG. 6. During the time period when "high" is being output from the set/reset circuit 231, the data "new registration process being executed" is set in the control flag that is stored in the register 222.

The set/reset circuit 232 outputs "high" when the new registration process is completed (when the new registration process has moved to the stage XP5 that is shown in FIG. 6) and outputs "low" when the move-in buffer 220 is opened. During the time period when "high" is being output from the set/reset circuit 232, the data "new registration process completed" is set in the control flag that is stored in the register 222.

The set/reset circuit 233 outputs "high" when the address matching data is output from the address comparing circuit 221 (at the timing of the stage XP2 in the write back process shown in FIG. 6) and outputs "low" when the move-in buffer 220 is opened. During the time period when "high" is being output from the set/reset circuit 233, the data "new registration process forcibly completed" is set in the control flag that is stored in the register 222.

The OR circuit 240 outputs "high" when an output from the set/reset circuit 231 or the set/reset circuit 232 has become "high" and outputs "low" when the outputs from both the set/reset circuits 231 and 232 have become "low".

The OR circuit 241 outputs "high" when an output from the set/reset circuit 232 or the set/reset circuit 233 has become "high" and outputs "low" when the outputs from both the set/reset circuits 232 and 233 have become "low".

The OR circuit 242 outputs "high" when the output of any one of the set/reset circuits 231, 232, and 233 has become "high", and outputs "low" when the outputs from all the set/reset circuits 231, 232, and 233 have become "low". The new registration process is curbed during a time period when "high" is being output from the OR circuit 242.

The AND circuit 250 outputs "high" when the output from the set/reset circuit 230 has become "high" and the output from the OR circuit 240 has become "low", and outputs "low" during other circumstances. During a time period when "high" is being output from the AND circuit 250, the data "retry time period" is set in the control flag that is stored in the register 222.

The AND circuit 251 outputs "high" when the output from the AND circuit 250 has become "high" and the address matching data is output from the address comparing circuit 221 (the timing at the stage XP2 of the write back process shown in FIG. 6), and outputs "low" during other circumstances. The move-in buffer 220 outputs the retry request to the pipeline 210 when "high" is output from the AND circuit 251.

The AND circuit 252 outputs "high" when the output from the set/reset circuit 230 has become "high" and the output from the OR circuit 242 has become "low", and outputs "low" during other circumstances. The request of the new registration process is output to the pipeline 210 when "high" is output from the AND circuit 252.

Thus, configuring the circuit that is shown in FIG. 7 enables to appropriately execute the cancellation of the new registration process and retrying of the write back process according to the present invention.

When a replacement of the first cache 200b occurs, upon retrieving the MO data that is a write back target, the second cache 200c according to the embodiment determines, based on the data that is set in the control flag, whether the new registration process of the MI data with respect to the recording position of the MO data is completed. If the new registration process is not completed, the second cache 200c cancels the new registration process to ensure that the request of the new registration process is not output to the pipeline 210. Thus, the drawback, which results in the latest data (MO data) registered in the cache data unit 68 being overwritten with the obsolete data (MI data) and being lost, can be overcome.

Further, according to the embodiment, if the cancellation of the new registration process is not carried out at the appropriate time, because the pipeline 210 of the second cache 200c repeatedly executes the write back process and the MO data is repeatedly written to the cache data unit 68, finally the latest data (MO data) is recorded in the cache data unit 68 even if the new registration process is delayed. Thus, the drawback, which results in a loss of the latest data, can be overcome.

Further, according to the embodiment, because the processes mentioned earlier can be realized without using a specific data path, a structure cost of the processor can be curbed.

Further, according to the embodiment, the pipeline 210, which can parallely execute a plurality of processes, retries the write back process. Thus, occupation of the MO port 66 can be prevented and processes other than the retry process can be swiftly executed.

According to an embodiment of the present invention, overwriting of a first data, which is the latest data, by a second data that is obsolete data can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A recording controller that carries out recording control of data with respect to a first cache and a second cache that are included in a processor, the recording controller comprising:
    a determining unit that determines, at the time of writing back to the second cache, a first data that is recorded in the first cache, whether a second data that is data before updating of the first data is already recorded in a recording position of the second cache whereto the first data is written back; and
    a recording controlling unit that curbs, upon the determining unit determining that the second data is not recorded in the recording position, a recording of the second data in the recording position, and records the first data in the recording position.

2. The recording controller according to claim 1, further comprising a recording unit that repeatedly records, at the time of the determining unit determining that the second data is not recorded in the recording position, in the event that the recording of the second data in the recording position has started, the first data in the recording position.

3. The recording controller according to claim 2, further comprising:
    a controller that controls a recording status of the second data in the recording position of the second cache whereto the first data is written back, and records therein data of the recording status of the second data, wherein
    the determining unit determines, based on the recording status of the second data, whether the second data is already recorded in the recording position of the second cache whereto the first data is written back.

4. The recording controller according to claim 3, wherein the recording unit determines, based on the recording status of the second data, whether the recording of the second data in the recording position has started, and repeatedly records, in the event that the recording of the second data has started, the first data in the recording position.

5. A recording control method that carries out recording control of data with respect to a first cache and a second cache that are included in a processor, the recording control method comprising:
    determining, at the time of writing back to the second cache, a first data that is recorded in the first cache, whether a second data that is data before updating of the first data is already recorded in a recording position of the second cache whereto the first data is written back; and
    curbing, upon the determining that the second data is not recorded in the recording position, a recording of the second data in the recording position, and recording the first data in the recording position.

6. The recording control method according to claim 5, further comprising repeatedly recording, at the time of the determining that the second data is not recorded in the recording position, in the event that the recording of the second data in the recording position has started, the first data in the recording position.

* * * * *